(12) United States Patent
Ma et al.

(10) Patent No.: US 11,443,763 B1
(45) Date of Patent: Sep. 13, 2022

(54) DISK DRIVE WITH MULTIPLE ACTUATORS ON A PIVOT AXIS

(71) Applicant: Seagate Technology LLC, Fremont, CA (US)

(72) Inventors: Yichao Ma, Singapore (SG); Xiong Liu, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/351,804

(22) Filed: Jun. 18, 2021

(51) Int. Cl.
*G11B 5/48* (2006.01)
(52) U.S. Cl.
CPC .................. *G11B 5/4813* (2013.01)
(58) Field of Classification Search
None
See application file for complete search history.

(56) References Cited

U.S. PATENT DOCUMENTS

| | | | |
|---|---|---|---|
| 3,940,794 A | | 2/1976 | Griffiths et al. |
| 4,092,681 A | | 5/1978 | Dix et al. |
| 4,318,145 A | * | 3/1982 | Frandsen ............... H02K 41/03 |
| 4,392,165 A | | 7/1983 | Wright |
| 4,423,448 A | * | 12/1983 | Frandsen ............. G11B 5/5521 |
| | | | 360/266.8 |
| 4,835,641 A | | 5/1989 | Maeda |
| 4,888,751 A | * | 12/1989 | Yoshimaru ........... G11B 27/002 |
| | | | 369/30.58 |
| 4,937,692 A | | 6/1990 | Okutsu |
| 5,467,238 A | | 11/1995 | Lee et al. |
| 5,812,345 A | * | 9/1998 | MacPherson ............ G11B 5/54 |
| 6,057,990 A | * | 5/2000 | Gilovich ................ G11B 21/00 |
| 6,191,924 B1 | * | 2/2001 | Koester ................ G11B 5/4813 |
| 6,344,950 B1 | | 2/2002 | Watson et al. |
| 6,356,404 B1 | | 3/2002 | Nguyen |
| 6,369,988 B1 | | 4/2002 | Yoshida et al. |
| 6,480,361 B1 | | 11/2002 | Patterson |

(Continued)

FOREIGN PATENT DOCUMENTS

JP          58100276 A   *   6/1983   .......... G11B 17/021

OTHER PUBLICATIONS

Linear Shaft Motor, Linear Shaft Motor—The Next Generation Actuator, https://www.pulsemotor.com/global/products/LSM.html, accessed May 21, 2021, 44 pages.

(Continued)

*Primary Examiner* — William J Klimowicz
(74) *Attorney, Agent, or Firm* — Westman, Champlin & Koehler, P.A.

(57) ABSTRACT

A data storage device includes a stack of data storage disks mounted on a spindle, a first arm and a second arm. The stack comprises a first plurality of upper disks and second plurality of lower disks. The first arm is movably attached to an actuator shaft, the first arm having a first head end that supports a first head, the first arm configured to move along a first portion of the actuator shaft to enable the first head to interact with data storage surfaces of the first plurality of upper disks. The second arm has a second head end that supports a second head, the second arm attached to and configured to move along a second portion of the actuator shaft, independently of the first arm, to enable the second head to interact with data storage surfaces of the second plurality of lower disks.

15 Claims, 6 Drawing Sheets

(56) References Cited

U.S. PATENT DOCUMENTS

| | | | |
|---|---|---|---|
| 6,490,138 B1 * | 12/2002 | Prater | G11B 33/08 |
| 6,549,377 B2 | 4/2003 | Yoshida et al. | |
| 6,603,640 B1 * | 8/2003 | Prater | F16C 19/54 |
| | | | 360/264.4 |
| 6,987,637 B2 | 1/2006 | Litvinov et al. | |
| 7,199,981 B2 | 4/2007 | Zabtcioglu | |
| 7,203,019 B1 * | 4/2007 | Liu | G11B 5/54 |
| 7,492,542 B2 | 2/2009 | van Zyl | |
| 7,672,083 B1 | 3/2010 | Yu et al. | |
| 7,710,683 B2 | 5/2010 | Craig et al. | |
| 8,958,172 B1 | 2/2015 | Hansen | |
| 8,958,173 B1 | 2/2015 | Hirano et al. | |
| 9,218,833 B1 | 12/2015 | Shah et al. | |
| 9,361,919 B1 | 6/2016 | Lieu et al. | |
| 10,192,575 B1 | 1/2019 | Resh | |
| 10,249,339 B1 | 4/2019 | Mendonsa et al. | |
| 10,269,380 B1 * | 4/2019 | Sun | G11B 5/4813 |
| 10,332,555 B1 * | 6/2019 | Keshavan | G11B 5/5578 |
| 10,490,217 B2 * | 11/2019 | Akatsuka | G11B 5/4813 |
| 10,622,012 B1 | 4/2020 | Tu et al. | |
| 10,706,879 B2 | 7/2020 | Garbarino | |
| 10,783,912 B1 * | 9/2020 | Tu | G11B 21/22 |
| 10,803,891 B1 | 10/2020 | Jacoby et al. | |
| 10,811,044 B2 | 10/2020 | Myers et al. | |
| 10,811,045 B2 * | 10/2020 | Mendonsa | G11B 5/5573 |
| 10,818,317 B1 | 10/2020 | Erden et al. | |
| 10,861,488 B2 * | 12/2020 | Hayasaka | G11B 5/4813 |
| 10,891,980 B1 * | 1/2021 | Keshavan | G11B 25/043 |
| 10,916,271 B1 | 2/2021 | Jacoby et al. | |
| 10,930,307 B2 * | 2/2021 | Sukla | G11B 5/4813 |
| 10,971,178 B2 * | 4/2021 | Garbarino | G11B 21/12 |
| 10,978,100 B1 | 4/2021 | Myers | |
| 11,031,037 B1 * | 6/2021 | Garbarino | G11B 17/021 |
| 11,176,963 B1 * | 11/2021 | Herdendorf | G11B 5/54 |
| 2002/0039259 A1 * | 4/2002 | Koyama | G11B 5/5521 |
| 2002/0149884 A1 * | 10/2002 | Price | G11B 5/4813 |
| 2004/0257710 A1 | 12/2004 | Limmer et al. | |
| 2005/0280945 A1 | 12/2005 | Duvall et al. | |
| 2008/0055773 A1 * | 3/2008 | Nigam | G11B 5/5569 |
| 2010/0091408 A1 * | 4/2010 | Albrecht | G11B 17/021 |
| | | | 360/110 |
| 2010/0182716 A1 | 7/2010 | Bandic et al. | |
| 2010/0205623 A1 | 8/2010 | Molaro et al. | |
| 2011/0038074 A1 | 2/2011 | Viskochil et al. | |
| 2018/0358039 A1 * | 12/2018 | Keshavan | G11B 5/5521 |
| 2018/0374513 A1 * | 12/2018 | Keshavan | G11B 5/4813 |
| 2019/0287557 A1 * | 9/2019 | Akatsuka | G11B 5/4813 |
| 2019/0333533 A1 | 10/2019 | Mendonsa et al. | |
| 2020/0027477 A1 * | 1/2020 | Garbarino | G11B 5/56 |
| 2020/0051588 A1 * | 2/2020 | Akatsuka | G11B 5/4813 |
| 2020/0202891 A1 | 6/2020 | Mendonsa et al. | |
| 2020/0227077 A1 * | 7/2020 | Sukla | G11B 5/4813 |
| 2020/0273488 A1 * | 8/2020 | Akatsuka | G11B 5/4813 |
| 2020/0302958 A1 * | 9/2020 | Hayasaka | G11B 5/4813 |
| 2021/0407537 A1 * | 12/2021 | Akatsuka | G11B 5/4813 |

OTHER PUBLICATIONS

U.S. Appl. No. 16/863,287, filed Apr. 30, 2020, entitled "Split Ramp for Data Storage Devices", 22 pages.

U.S. Appl. No. 17/163,983, filed Feb. 1, 2021, entitled "Ramp Activation Systems Foran Elevator Drive", 34 pages.

* cited by examiner

DISK DRIVE WITH MULTIPLE ACTUATORS ON A PIVOT AXIS

SUMMARY

In one embodiment, a data storage device comprises a stack of data storage disks mounted on a spindle, a first arm and a second arm. The stack comprises a first plurality of upper disks and second plurality of lower disks. The first arm is movably attached to an actuator shaft, the first arm having a first head end that supports a first head, the first arm configured to move along a first portion of the actuator shaft to enable the first head to interact with data storage surfaces of the first plurality of upper disks. The second arm is movably attached to the actuator shaft, the second arm having a second head end that supports a second head, the second arm configured to move along a second portion of the actuator shaft, independently of the first arm, to enable the second head to interact with data storage surfaces of the second plurality of lower disks.

In another embodiment, a data storage device comprises a stack of a plurality of data storage disks, first and second actuator shafts, first and second arms, first and second heads, and first and second linear actuators. The stack comprises a first read/write surface defining an x-y plane and a second read/write surface parallel to the first read/write surface. The first actuator shaft and the second actuator shaft are aligned end-to-end and have a common longitudinal axis. The first arm is movably attached to the first actuator shaft, the first arm having a first head end that is movable relative to the first read/write surface. The first head is supported by the first head end of the first arm, wherein the first head is configured to interact with the first read/write surface. The first linear actuator is configured to move the first arm along the first actuator shaft. The second arm is movably attached to the second actuator shaft, the second arm having a second head end that is movable relative to the second read/write surface. The second head supported is by the second head end of the second arm, wherein the second head is configured to interact with the second read/write surface. A second linear actuator is configured to move the second arm along the second actuator shaft independently of motion of the first arm along the first actuator shaft.

In yet another embodiment, a method comprises moving first and second arms in a z direction. Moving the first arm in the z direction along a longitudinal axis positions a first head of the first arm relative to a first plurality of data storage disks. Moving the second arm in the z direction along the longitudinal axis, independently of moving the first arm in the z direction, positions a second head of the second arm relative to a second plurality of data storage disks.

Other features and benefits that characterize embodiments of the disclosure will be apparent upon reading the following detailed description and review of the associated drawings.

DETAILED DESCRIPTION OF ILLUSTRATIVE EMBODIMENTS

In general, embodiments of the disclosure relate to a hard disk drive (HDD) having fewer heads than the number of disk surfaces. This greatly reduces costs associated with the conventionally high numbers of read/write heads and associated systems. However, having a single head assembly per HDD can lead to slow performance due to the time taken to move the head assembly from disk to disk. Thus, some systems use multiple actuator arm and head assemblies per stack of disks. Most commonly, two arms are placed on different sides of the disk, taking up valuable space in a drive of a typical form factor.

In embodiments of the disclosure, multiple actuator arm and head assemblies are used to increase performance, but space savings are realized by providing the multiple arm and head assemblies on the same longitudinal pivot axis. In an exemplary embodiment, each of two assemblies has independently movable arms that travel up and down a pivot shaft and rotate on and off the disk stack. For example, in a 10-disk stack, one head stack assembly may read and write relative to the top 5 disks, and the second head stack assembly may read and write relative to the bottom 5 disks. An electromagnetic lock scheme is disclosed to prevent z direction motion of each of the head stack assemblies independently. While a particular number of head stack assemblies is described for a particular numbers of disks in a stack, it is contemplated that more or fewer head stack assemblies can be used with more or fewer disks in a stack. A primary consideration is that more than one head stack assembly is provided for a single stack, and the multiple head stack assemblies share a common pivot axis, such as defined by a single shared magnetic shaft in an exemplary embodiment.

The present disclosure generally relates to data storage devices that utilize magnetic storage media, such as hard disks. The storage capacity of hard disk drives has steadily increased due to an increase in areal density provided by such technological advances as perpendicular recording, shingled magnetic recording (SMR), heat-assisted magnetic recording (HAMR), interleaved magnetic recording (IMR), microwave-assisted magnetic recording (MAMR), and helium filling, for example.

One way to address the need for greater HDD performance is to utilize multiple read/write heads in parallel. Such parallelism can increase the rate of input/output operations (IOPS) and thereby speed up certain operations. Use of simultaneously operating read/write heads can provide other options; for example, a HDD can be configured with zones having different levels of throughput and capacity, and multiple heads can be operated in different modes to improve throughput in some zones while improving capacity (or other performance parameter) in others.

In embodiments described below, a hard disk drive includes multiple heads, driven by separate actuators, that can read from and/or write to one or more disks simultaneously. Simultaneous active heads can be used to increase data rate or for other purposes (such as to increase reliability or service different requests in parallel, for example). The signal processing circuitry of the drive may include parallel processing paths. For example, the processing circuitry may include multiple read/write channels for processing (e.g., decoding and/or encoding) user and control data. The processing circuitry may also include multiple servo control logic sections that allow data from each reader to be used for servo control of the head or heads in which the readers are embedded. This servo logic also provides timing signals used by the signal processing logic.

Additional information relevant to high performance of a disk drive is provided in the following commonly owned patent applications and patents, which are hereby incorporated by reference: US Published Patent Application No. 2004/0257710 for "Hard drive actuator arm with reduced skew variation;" U.S. Pat. No. 6,356,404 for "Simultaneously biasing multiple magneto-resistive read elements;" U.S. Pat. No. 6,987,637 for "Magnetic recording system which eliminates skew angle effect;" U.S. Pat. No. 9,361,919 for "Disk drive with parallel head actuation;" and U.S. Pat. No. 10,818,317 for "Multi-actuator data system."

In general, in order to keep read/write heads from landing on one or more disks in a hard disk drive when, for example, power is removed from the HDD, and to prevent the heads from colliding with outer edges of the disks during load and unload operations, a head-support ramp is provided adjacent to an outer diameter (OD) of the disk or disks. In current HDDs, a number of heads is equal to a number of effective disk surfaces, and the heads are rotated for positioning over their corresponding disk surfaces. There is typically no up/down movement of the heads in such HDDs. However, in an "elevator" drive, for example, the number of heads employed is less than the number of disk surfaces, and a head stack assembly (HSA) including the fewer number of heads is moved up and down to enable a single head to read from multiple disk surfaces. Suitable elevator configurations include, for example, those described in the following commonly owned patent, which is hereby incorporated by reference: U.S. Pat. No. 10,269,380 for "Disk drive having multiple disks accessible by a reduced number of read/write heads."

The up/down movement is possible when the HSA is rotated such that the heads are away from the disks and are supported on a ramp. Conventional ramps are a single unit with an edge of the ramp over the OD of the disks. This ramp design prevents up/down movement of the ramp along with the HSA because the edge of the ramp over the OD may collide with the disks during up/down movement of the ramp. Some embodiments of the disclosure employ a split ramp including a first ramp portion adjacent to the OD of the disks and a vertically moveable ramp portion that is adjacent to the first ramp portion. To enable up/down movement of the HSA, the HSA is first rotated away from the disks and away from the first ramp (if any), and positioned such that the heads are supported on a moveable ramp portion. Then, the HSA and the moveable portion of the ramp are moved in unison by an elevator in the HDD. While particular embodiments of movable ramps are shown in the illustrations, it is to be understood that other ramp configurations can also be used, such as those described in the following commonly owned patent applications, which are hereby incorporated by reference: U.S. application Ser. No. 16/863,287 filed on Apr. 30, 2020, entitled "Split Ramp for Data Storage Devices;" and U.S. application Ser. No. 17/163,983 filed on Feb. 1, 2021, entitled "Ramp Activation Systems for an Elevator Drive."

Figure 1:
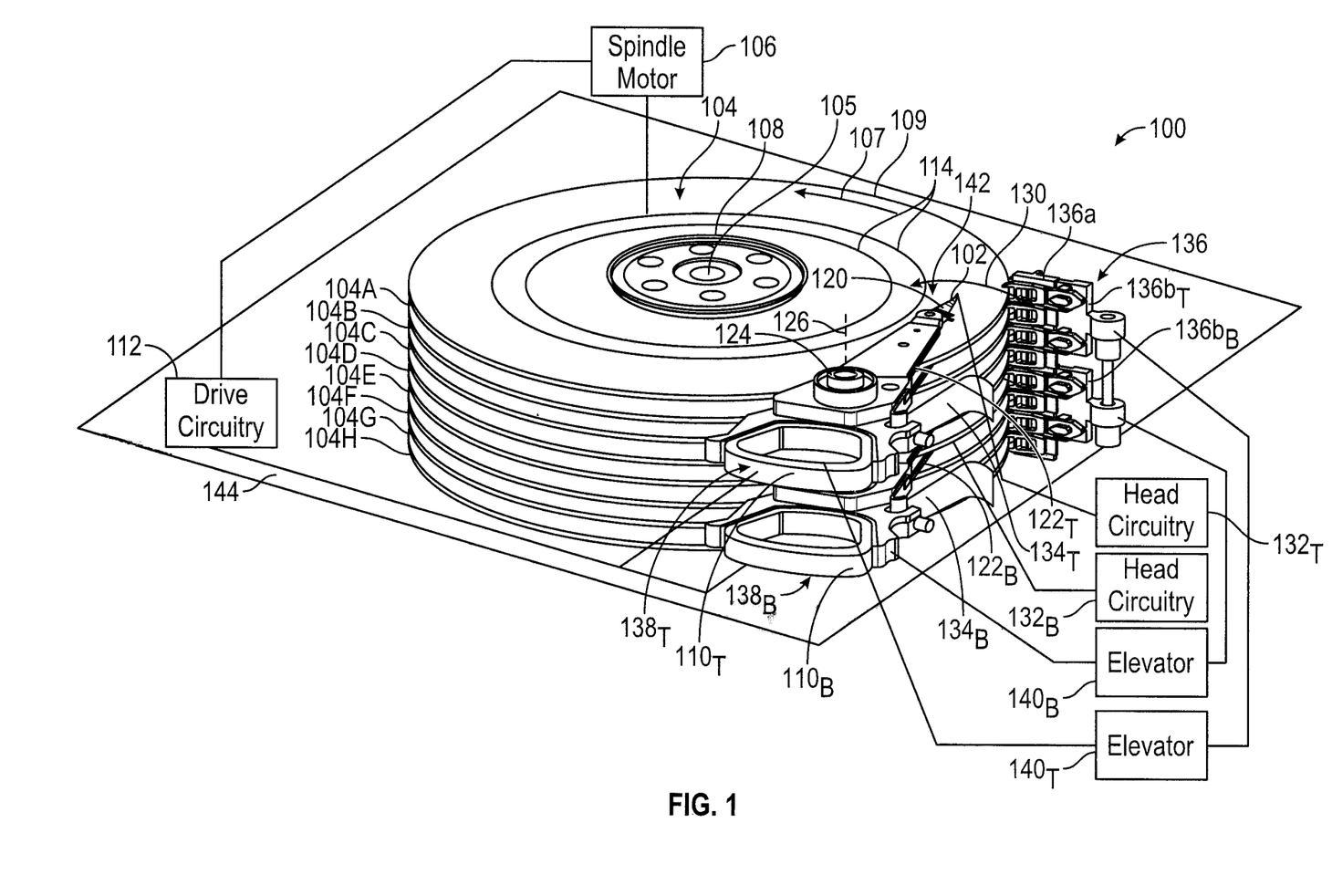
FIG. 1 is a schematic illustration of an exemplary data storage device.

FIG. 1 shows an illustrative operating environment in which certain embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for the same or similar elements. All descriptions of an element also apply to all other versions of that element unless otherwise stated. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a schematic illustration of a data storage device (DSD) 100 including data storage media, heads for reading data from and/or writing data to the data storage media and a split ramp for supporting the heads. In data storage device 100, heads 102 may be positioned over storage media 104 to read data from and/or write data to the data storage media 104. In the embodiment shown in FIG. 1, the data storage media 104 are rotatable data storage disks stacked on spindle 105, with each disk 104 having opposing surfaces that serve as data storage surfaces. For read and write operations, a spindle motor 106 (illustrated schematically) rotates the media 104 as illustrated by arrow 107 and dual actuator mechanisms 110 position the heads 102 relative to data tracks 114 on the rotating media 104 between an inner diameter (ID) 108 and an outer diameter (OD) 109. Both the spindle motor 106 and actuator mechanisms 110 are connected to and operated through drive circuitry 112 (schematically shown). In the illustrated embodiments, some reference numbers associated with elements of the top head stack assembly $138_T$ include a subscript "T" designation, and reference numbers associated with elements of the bottom head stack assembly $138_B$ include a subscript "B" designation.

Each of heads 102 is coupled to its respective actuator mechanism 110 through a suspension assembly that includes a load beam 120 connected to an actuator arm 122 of the mechanism 110, for example through a swage connection. The actuator mechanism 110 is rotationally coupled to a frame or base deck 144 through a pivot shaft 124 to rotate about longitudinal axis 126 of shaft 124. The actuator mechanism 110 moves the heads 102 in a cross-track direction as illustrated by arrow 130. Each of the heads 102 includes one or more transducer elements (not shown) coupled to head circuitry 132 through flex circuit 134.

In general, in order to keep read/write heads 102 from landing on disks 104 in a data storage device 100 when, for example, power is removed from the data storage device 100, and to prevent the heads 102 from colliding with outer edges of the disks 104 during load and unload operations, a head support ramp assembly 136 is provided adjacent to the OD 109 of the disks 104. In data storage device 100, a number of heads 102 is less than a number of disk 104 surfaces. In the particular embodiment shown in FIG. 1, data storage device 100 includes eight disks 104A, 104B, 104C, 104D, 104E, 104F, 104G, 104H with a total of sixteen data storage surfaces, and two heads 102 on each of two actuator arms 122. Thus, the single data storage device 100 includes dual actuator mechanisms 110, dual actuator arms 122 and dual load beams 120. The top actuator mechanism $110_T$, the top actuator arm $122_T$ and the top load beam 120 are collectively referred to as the top head stack assembly (HSA) $138_T$. The bottom actuator mechanism $110_B$, the bottom actuator arm $122_B$ and the bottom load beam (not visible in FIG. 1) are collectively referred to as the bottom head stack assembly (HSA) $138_B$.

In data storage device 100 of FIG. 1, each actuator arm 122 may be moved independently of the other actuator arm 122 along axis 126 of shaft 124 to different positions under motive of a respective elevator 140, which are schematically shown. In an uppermost position shown in FIG. 1, the two heads 102 coupled to the top actuator arm $122_T$ interact with upper and lower data storage surfaces of disk 104A, and the two heads 102 coupled to the bottom actuator arm $122_B$ interact with upper and lower data storage surfaces of disk 104E.

In exemplary embodiments, the two actuators 110 are independent. Actuator $110_T$ controls the rotation of top actuator arm $122_T$ about the axis 126 of the pivot shaft 124. Actuator $110_B$ controls, independently, the rotation of the bottom actuator arm $122_B$ about the same pivotal axis 126 of the shaft 124, which in an exemplary embodiment extends vertically through both head stack assemblies 138. Each of the top and bottom actuator arms 122 also is moveable in the vertical z direction by its own independent elevator $140_T$ or $140_B$, respectively. In an exemplary embodiment, the elevator $140_T$ allows for limited range of motion vertically of the top actuator arm $122_T$ to access disk surfaces of the top four disks 104A, 104B, 104C and 104D. In an exemplary embodiment, the elevator $140_T$ is also operationally connected to moveable ramp $136b_T$ to move it in the z direction in unison with the top actuator arm $122_T$. In an exemplary embodiment, the elevator $140_B$ allows for limited range of motion vertically of the bottom actuator arm $122_B$ to access disk surfaces of the bottom four disks 104E, 104F, 104G and 104H. In an exemplary embodiment, the elevator $140_B$ is also operationally connected to moveable ramp $136b_B$ to move it in the z direction in unison with the bottom actuator arm $122_B$.

While the illustrated system has eight disks 104 and two head stack assemblies 138, it is contemplated that the teachings described herein can be applied to a disk stack including any number of disks stacked on a single spindle 105 and any number of head stack assemblies 138 arranged on a single shaft 124 (or multiple linearly aligned shaft sections). In other positions of the top and bottom actuator arms 122 (not shown), which are below the uppermost illustrated positions, the same two actuator arm assemblies interact with data storage surfaces of disks 104B, 104C, 104D, 104F, 104G and 104H.

To enable the up/down movement of each HSA $138_T$, $138_B$, head-support ramp 136 in some embodiments is designed as a split ramp with a stationary portion 136a and moveable portion 136b. Each HSA $138_T$, $138_B$ can move in a limited range along shaft 124 from either an upper position to a lower position or from a lower position to an upper position for its respective portion of the disk stack. In either case, the actuator arm 122 is first rotated about axis 126, until a head end 142 of the actuator arm 122 is supported on the respective moveable portion $136b_T$, $136b_B$ of the head-support ramp assembly 136. Then, the paired actuator arm 122 and the moveable portion 136b are moved in unison along axis 126 (such as vertically or in a z direction) by the operationally connected elevator 140. In some embodiments, an entire ramp 136 or a portion thereof can also be moved in the x-y plane off the disk stack, such as by retraction, flexing, or rotation, for example.

In one embodiment, elevator $140_T$, $140_B$ may be driven up and down by a coil and a magnet (not shown) with hard stops (such as plates 150 shown in FIGS. 2 and 3) at both ends that limit the extent of upward and downward movement of the respective HSA 138. In general, any suitable driving mechanism may be used to move elevator 140 up and down. Exemplary drivers for Z direction motion of elevator 140 include a ball screw with an internal motor, a voice coil motor, an inchworm style brake crawler, a linear motor, a shape memory alloy based actuator, and a combination of the above.

Figure 2:
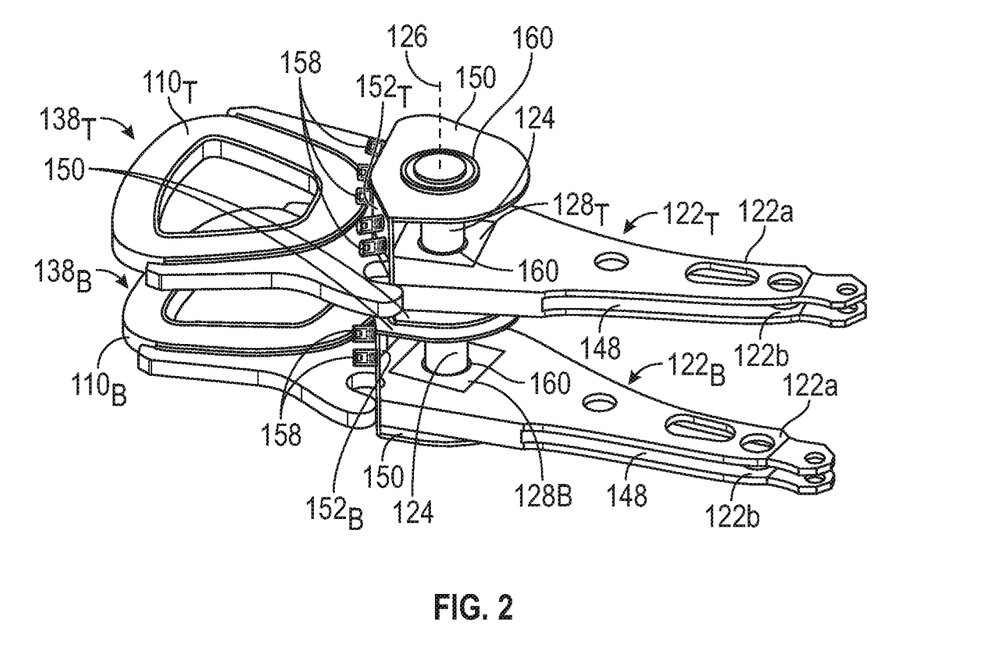
FIG. 2 is a perspective view of portions of dual head stack assemblies of the data storage device.

As labeled in FIG. 2, in some embodiments, each actuator arm 122 includes upper plate 122a and lower plate 122b separated by channel 148 sized so that the plates 122a, 122b fit over and under a disk 104 without physically contacting the disk 104. Respective upper and lower load beam portions (not shown in FIG. 2) attached to the ends of upper and lower plates 122a, 122b carry heads 102 for reading and writing on top and bottom surfaces of a disk 104. A lift tab extends from the load beam 120 to rest on the head support ramp assembly 136 when the disk drive storage device 100 is in an off or non-operating state.

For use of heads 102 for reading and writing data relative to disk 104, a selected actuator 110 is activated to rotate the actuator arm 122 about shaft 124, pivot bearing 160 and pivot axis 126, to thereby move the head end 142 of HSA 138 off of the head support ramp assembly 136 and to the disk 104.

As shown in FIG. 2, each arm 122 has an associated elevator in the form of linear shaft motor 128, which allows for vertical motion of the respective arm 122 between plates 150; plates 150 serve as hard stops for the motion. In an exemplary embodiment, both of the linear shaft motors $128_T$ and 128$_B$ (and their respective actuator arm 122) travel along a single longitudinal axis 126. The pivot shaft 124 can be provided as a single, unitary elongated element. Alternatively, each of the head stack assemblies 138$_T$ and 138$_B$ could have its own shaft 124, in which case the separate shafts would be aligned end to end along the same axis 126. A suitable linear shaft motor 128 is commercially available from Nippon Pulse of Radford, Va. as a linear servo motor. Suitable linear servo motors include a shaft made of a rare earth-iron-boron permanent neodymium magnet and include a "forcer" of cylindrically wound coils that can be supplied with optional Hall Effect devices. The magnetic shaft 124 supplies the magnetic field on which the forcer of the motor 128 acts.

Figure 3:
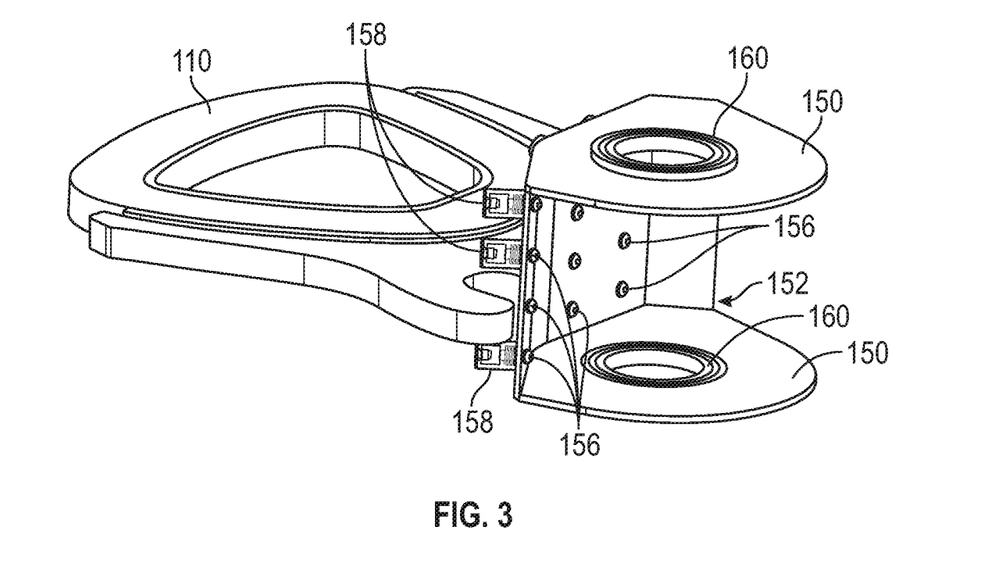
FIG. 3 is a perspective view of a portion of a head stack assembly, showing a holder through which a peg of a lock may extend.
Figure 4:
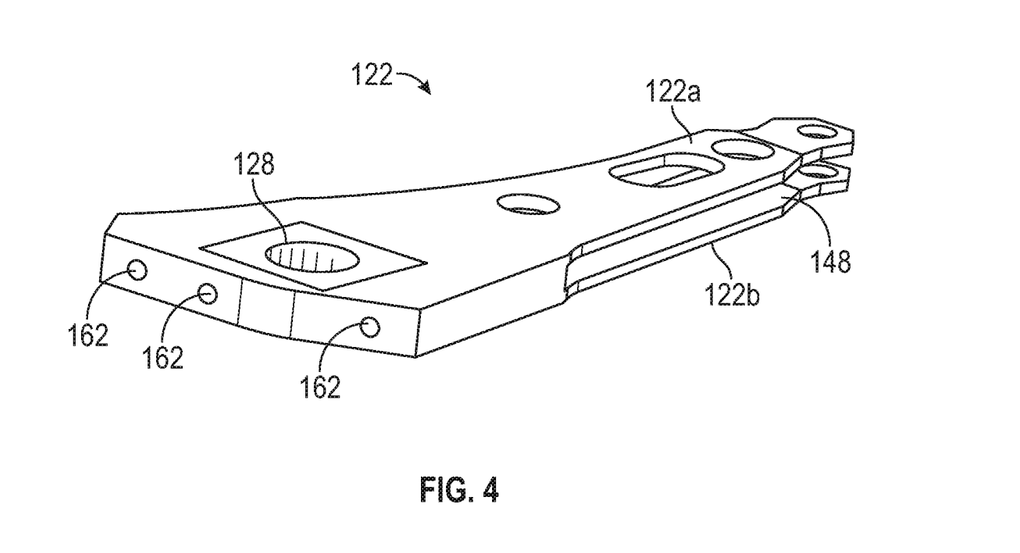
FIG. 4 is a perspective view of an exemplary actuator arm including sockets configured to receive each locking peg.
Figure 5:
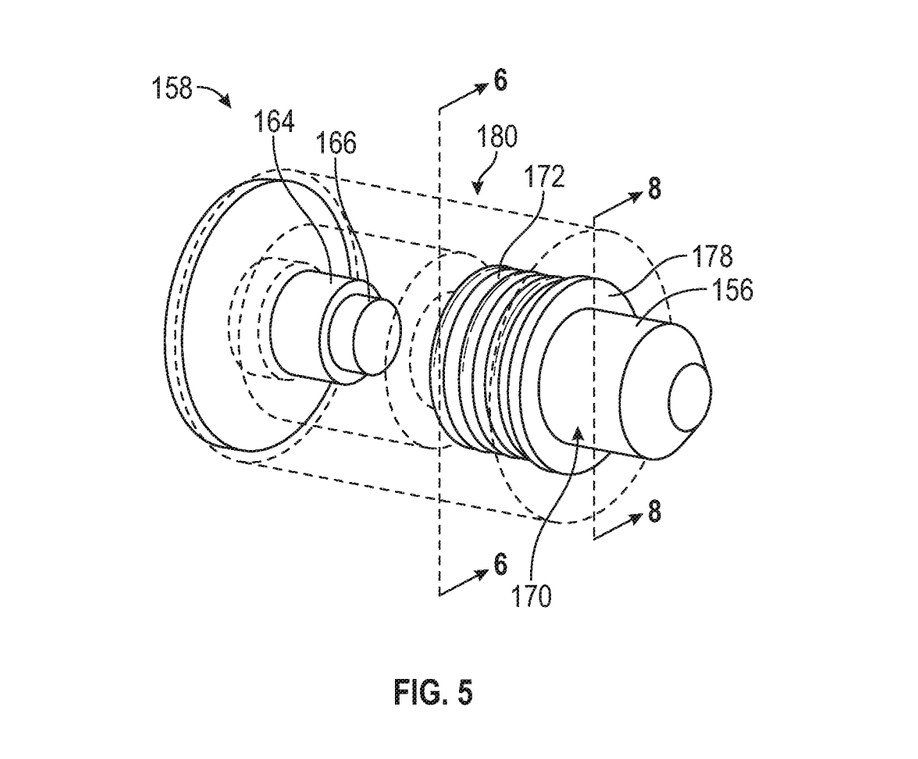
FIG. 5 is a partially transparent perspective view of an exemplary lock.
Figure 6:
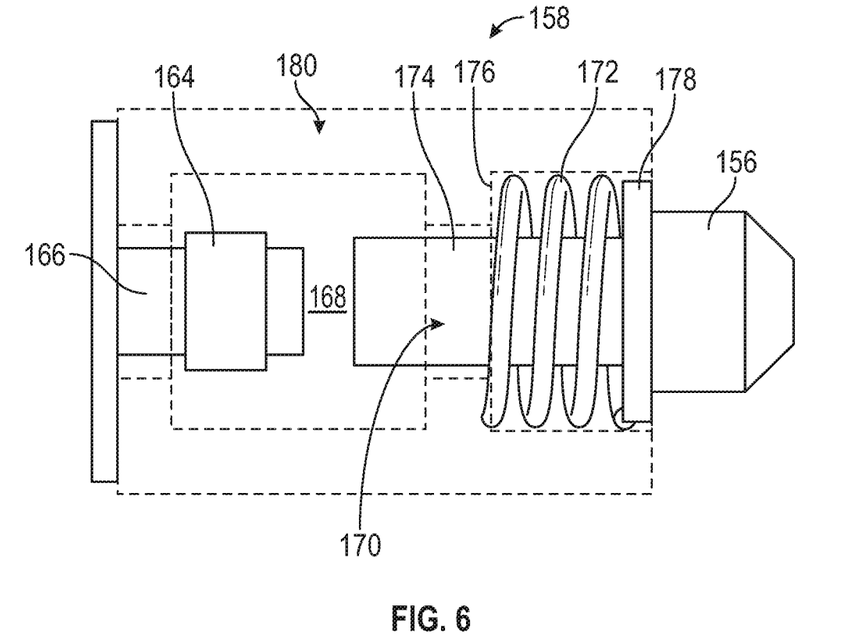
FIG. 6 is a cross-sectional view, taken along line 6-6 of FIG. 5, of the lock in a default protruding, locked configuration.
Figure 7:
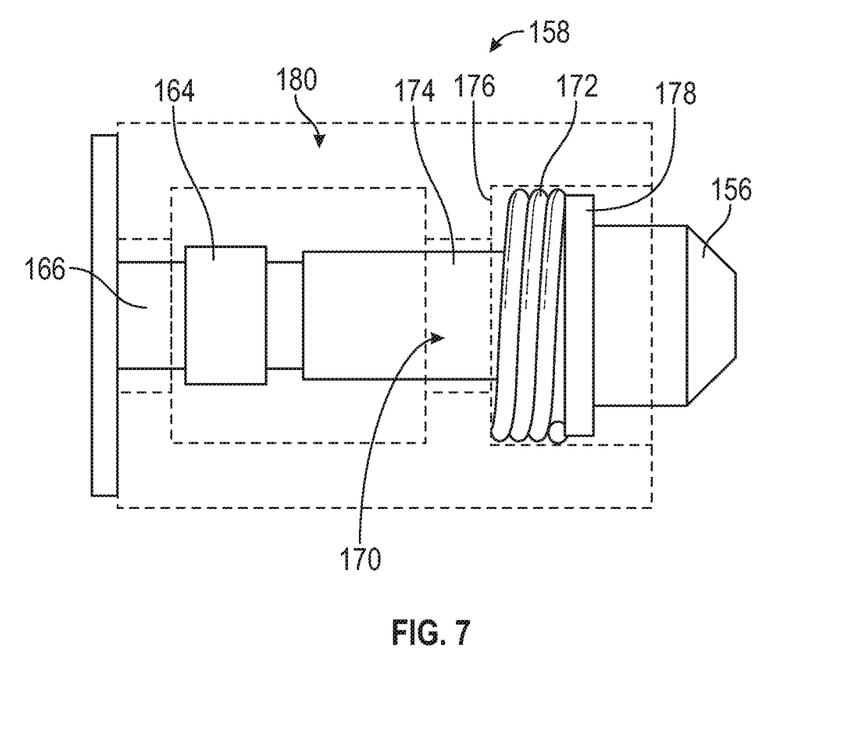
FIG. 7 is a cross-sectional view of the lock in an energized, retracted and unlocked configuration.
Figure 8:
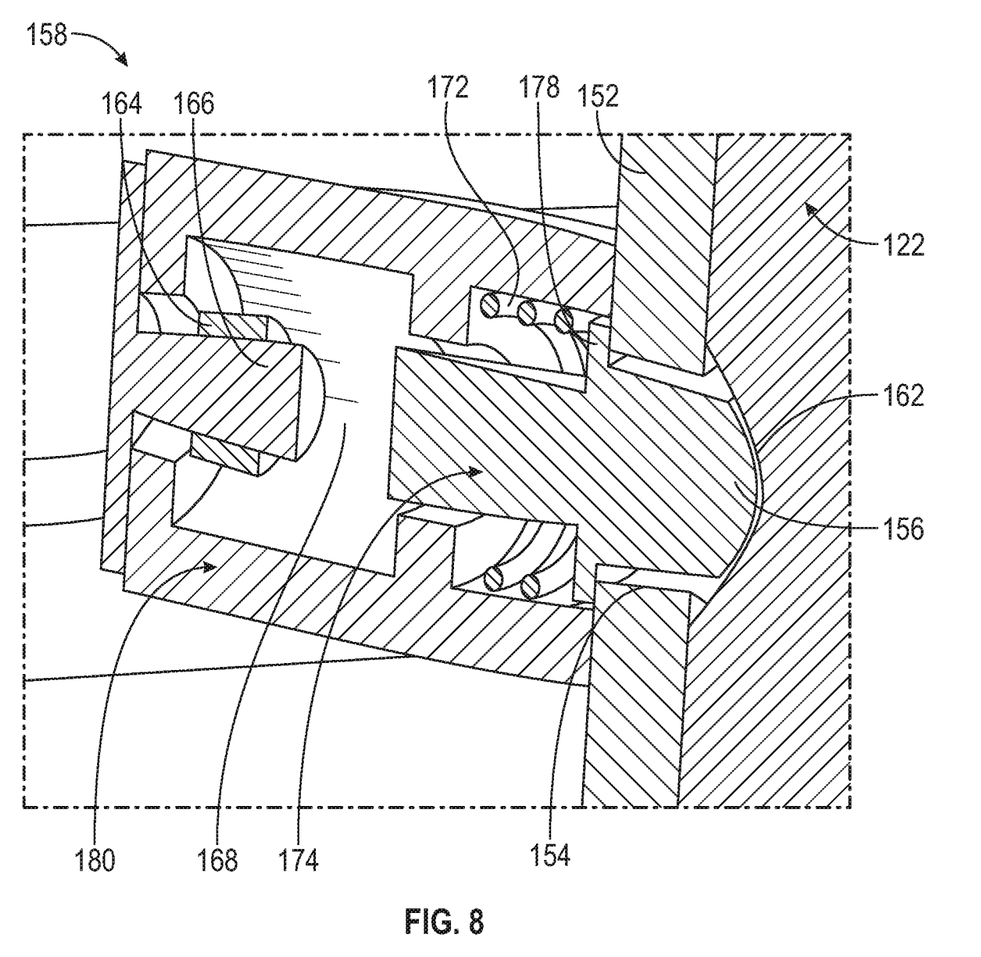
FIG. 8 is a partial cross-sectional view, taken along line 8-8 of FIG. 5, of an assembly including a lock, a HSA holder and actuator arm, in a locked configuration.

FIG. 3 is a perspective view of a portion of head stack assembly 138, showing a holder 152 extending between the stop plates 150, and having apertures 154 (labeled in FIG. 8) through which a peg 156 of a lock 158 may extend. In an exemplary embodiment, each of the plates 150 holds a pivot bearing 160 through which magnetic shaft 124 extends. As shown in FIGS. 4-8, in an exemplary embodiment, arm 122 includes sockets 162 configured to receive each locking key or peg 156. FIG. 5 is a partially transparent view of an exemplary lock 158. FIG. 6 is a cross-sectional view, taken along line 6-6 of FIG. 5, of the lock 158 in a default protruding, locked configuration. FIG. 7 is a cross-sectional view of the lock 158 in an energized, retracted and unlocked configuration. FIG. 8 is a partial cross-sectional view, taken along line 8-8 of FIG. 5, of an assembly including a lock 158 with HSA holder 152 and actuator arm 122, in a locked configuration. Each of the HSA's 138 operates separately and concurrently to perform read, write, seek and elevate tasks so that the performance of the hard disk drive can be approximately double that of a drive having only a single actuator and arm assembly.

In the illustrated embodiment, twelve locks 158 are shown extending through holder 152 so that peg 156 can be inserted into socket 162 of actuator arm 122. However, it is contemplated that more or fewer locking devices, of different dimensions can be used. In the illustrated configuration, the twelve locks 158 are arranged in 4 horizontal rows, each of the rows corresponding to a vertical position of actuator arm 122 to place the upper arm 122a and lower arm 122b above and below one the four disks of the portion of the disk stack for the relevant HSA 138. Thus, a vertical location of the actuator arm 122 is locked in one of four discrete vertical positions, thereby providing for accurate vertical placement of the actuator arm 122. In a default configuration, each actuator arm 122 is locked in one of the four vertical positions. When vertical motion of the actuator arm 122 is desired, the locks 158 are energized to retract pegs 156 from sockets 162, so that the actuator arm 122 can move under the motive of linear shaft motor 128, which is a particular form of elevator 140.

FIG. 6 shows a cross-sectional view of an exemplary lock 158, taken along line 6-6 of FIG. 5. In an exemplary embodiment, lock 158 includes an electromagnetic coil 164 surrounding an iron bolt 166. In the default configuration shown in FIG. 6, when the electromagnetic coil 164 is not energized, a gap 168 is maintained between the bolt 166 and an iron key 170. A helical spring 172 surrounds a portion of a shaft 174 of key 170, the spring being confined between shoulder 176 of key body 180 and flange 178 of key 170.

As shown in FIG. 7, to retract peg 156 into body 180 of key 158, the electromagnetic coil 164 is energized so that the iron bolt 166 becomes a magnet and attracts the iron shaft 174 of key 170. Thereby, the gap 168 is closed and spring 172 is compressed between flange 178 of key 170 and shoulder 176 of lock body 180. This axial motion of the key 170 within body 180 of lock 158 retracts peg 156 sufficiently to remove the peg 156 from socket 162 of actuator arm 122. While a portion of peg 156 still protrudes outside body 180, that portion is substantially the same dimension as a thickness of holder 152 at aperture 154 and thereby unlocks the actuator arm 122 from the holder 152. In an exemplary embodiment, head circuitry 132 for each of the actuators 110 controls all of the twelve locks 158 for a holder 152 in concert. Therefore, all of the locks 158 for a particular holder 152 are either energized (unlocked) or de-energized (locked) in unison. With locks 158 energized, thereby withdrawing pegs 156 from the respective sockets 162, the relevant actuator arm 122 is thereby freed to move in a z direction up and down the steel shaft 124 under the motive of the linear shaft motor 128. When a suitable position of the actuator arm 122 on shaft 124 has been reached, the electromagnetic coil 164 for each of the locks 158 of that actuator assembly 110 is thereby unenergized and the spring returns to its uncompressed configuration, thereby biasing to the default locked position shown in FIG. 6 to maintain the actuator arm 122 in the selected vertical position on shaft 124.

Figure 9:
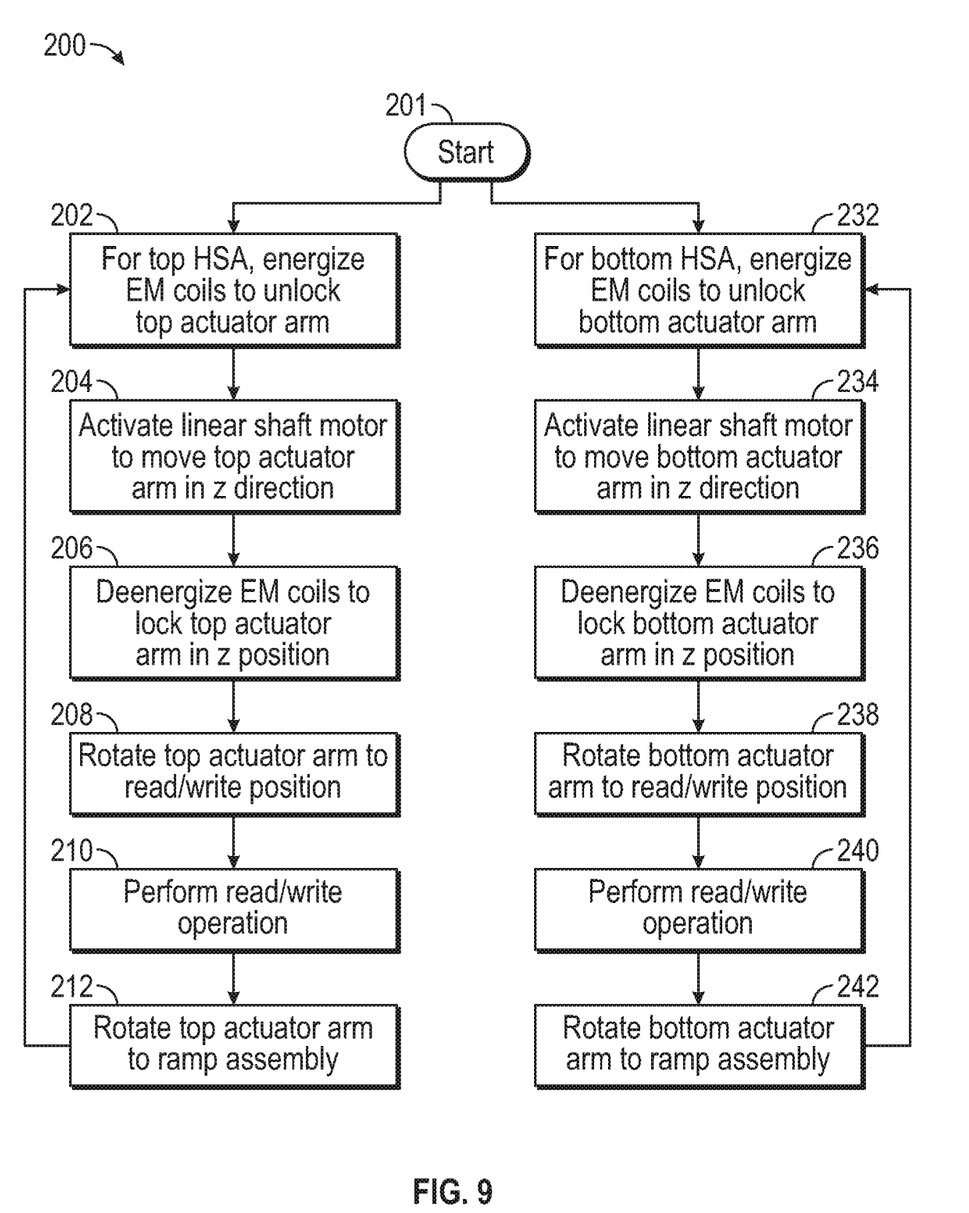
FIG. 9 is a flowchart of an example method for using the described systems.

FIG. 9 is a flowchart of an exemplary method 200 for use of the data storage device 100, which starts at 201. The top HSA 138$_T$ follows a completely independent sequence of steps 202-212 compared to the bottom HSA 138$_B$, which follows a sequence of steps 232-242. At 202, for top HSA 138$_T$, electromagnet (EM) coils 164 are energized to unlock top actuator arm 122$_T$. At 204, linear shaft motor 128$_T$ is activated to move the top actuator arm 122$_T$ in the z direction to a desired location to access a particular disk 104 of the stack of upper disks. At 206, EM coils 164 are deenergized to lock top actuator arm 122$_T$ in the desired vertical position. At 208, top actuator arm 122$_T$ is rotated on shaft 124 about axis 126 to position its head end 142 in a read/write position relative to a desired data track 114. At 210, the head 102 on head end 142 performs a read/write operation at the track 114. At 212, the top actuator arm 122$_T$ is rotated on shaft 124 about axis 126 to return its head end 142 to rest on ramp 136. If more read/write operations are to be performed by the top HSA 138$_T$, the method returns to 202. If the arm is already at a suitable Z position, the method skips to 208.

Operating concurrently with the top HSA 138$_T$ but independently thereof, the bottom HSA 138$_B$ follows a sequence of steps 232-242. At 232, for bottom HSA 138$_B$, EM coils 164 are energized to unlock bottom actuator arm 122$_B$. At 234, linear shaft motor 128$_B$ is activated to move the bottom actuator arm 122$_B$ in the z direction to a desired location to access a particular disk 104 of the lower stack of disks. At 236, EM coils 164 are deenergized to lock bottom actuator arm 122$_B$ in the desired vertical position. At 238, bottom actuator arm 122$_B$ is rotated on shaft 124 about axis 126 to position its head end 142 in a read/write position relative to a desired data track 114. At 240, the head 102 on head end 142 performs a read/write operation at the track 114. At 242, the bottom actuator arm 122$_B$ is rotated on shaft 124 about axis 126 to return its head end 142 to rest on ramp 136. If more read/write operations are to be performed by the bottom HSA 138$_B$, the method returns to 232. If the arm is already at a suitable Z position, the method skips to 238.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. All patent documents mentioned in the description are incorporated by reference.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. For example, features described with respect to one embodiment may be incorporated into other embodiments. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
a stack of data storage disks mounted on a spindle, the stack comprising a first plurality of upper disks and second plurality of lower disks;
a first arm movably attached to an actuator shaft, the first arm having a first head end that supports a first head, the first arm configured to move along a first portion of the actuator shaft to enable the first head to interact with data storage surfaces of the first plurality of upper disks, and wherein the first arm comprises a socket on a second end of the first arm that is opposite the first head end; a plurality of locks configured to retain the first arm in a selected one of a corresponding plurality of positions relative to the first portion of the actuator shaft by engaging the socket;
and
a second arm movably attached to the actuator shaft, the second arm having a second head end that supports a second head, the second arm configured to move along a second portion of the actuator shaft, independently of the first arm, to enable the second head to interact with data storage surfaces of the second plurality of lower disks.

2. The data storage device of claim 1 wherein each of the first portion of the actuator shaft and the second portion of the actuator shaft is parallel to the spindle.

3. The data storage device of claim 1 comprising a first linear shaft motor configured to move the first arm along the first portion of the actuator shaft.

4. The data storage device of claim 3 comprising a second linear shaft motor configured to move the second arm along the second portion of the actuator shaft.

5. The data storage device of claim 1 comprising a pivot bearing between the first arm and the first portion of the actuator shaft.

6. The data storage device of claim 1 comprising two plates disposed at opposite ends of the first portion of the actuator shaft.

7. The data storage device of claim 1 comprising:
a holder connected to the first portion of the actuator shaft; and
wherein at least one of the plurality of locks comprises a peg configured to extend through an aperture of the holder and into the socket.

8. The data storage device of claim 7 wherein the at least one of the plurality of locks comprises an electromagnetic coil configured to retract the peg from the socket.

9. The data storage device of claim 7 comprising a helical spring configured to bias the peg into the socket.

10. The data storage device of claim 7 wherein the plurality of locks are spaced along the holder at positions corresponding to the first plurality of upper disks.

11. The data storage device of claim 1, comprising a movable ramp that is configured to move in unison with the first arm in a z direction parallel to the first portion of the actuator shaft.

12. A data storage device comprising:
a stack of a plurality of data storage disks, the stack comprising a first read/write surface defining an x-y plane and a second read/write surface parallel to the first read/write surface;
a first actuator shaft and a second actuator shaft aligned end-to-end and having a common longitudinal axis;
a first arm movably attached to the first actuator shaft, the first arm having a first head end that is movable relative to the first read/write surface, wherein the first arm comprises a socket on a second end of the first arm that is opposite the head end;
a first head supported by the first head end of the first arm, wherein the first head is configured to interact with the first read/write surface;
a first linear actuator configured to move the first arm along the first actuator shaft; a plurality of locks configured to retain the first arm in a selected one of a corresponding plurality of positions relative to the first actuator shaft by engaging the socket;
a second arm movably attached to the second actuator shaft, the second arm having a second head end that is movable relative to the second read/write surface;

a second head supported by the second head end of the second arm, wherein the second head is configured to interact with the second read/write surface; and a second linear actuator configured to move the second arm along the second actuator shaft independently of motion of the first arm along the first actuator shaft.

13. The data storage device of claim 12 comprising a first rotary actuator configured to pivot the first arm about the first actuator shaft.

14. The data storage device of claim 13 comprising a second rotary actuator configured to pivot the second arm about the second actuator shaft independently of motion of the first arm about the first actuator shaft.

15. The data storage device of claim 12 comprising:

a holder connected to the first actuator shaft; and wherein at least one of the plurality of locks comprises a peg configured to extend through an aperture of the holder and into the socket.

* * * * *